(12) United States Patent
Weber et al.

(10) Patent No.: US 8,974,924 B2
(45) Date of Patent: Mar. 10, 2015

(54) OLEOPHOBIC COATING ON SAPPHIRE

(71) Applicant: Apple Inc., Cupertino, CA (US)

(72) Inventors: Douglas Weber, Arcadia, CA (US); Naoto Matsuyuki, Kasugai (JP)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/033,890

(22) Filed: Sep. 23, 2013

(65) Prior Publication Data

US 2014/0087197 A1 Mar. 27, 2014

Related U.S. Application Data

(60) Provisional application No. 61/704,275, filed on Sep. 21, 2012.

(51) Int. Cl.
B32B 18/00 (2006.01)
G02B 1/10 (2006.01)
H04M 1/02 (2006.01)

(52) U.S. Cl.
CPC ............. G02B 1/105 (2013.01); H04M 1/0202 (2013.01)
USPC ........... 428/701; 428/688; 428/689; 428/697; 428/702

(58) Field of Classification Search
CPC  B32B 2255/00; B32B 2250/20; B32B 18/00; B32B 17/06; B32B 2250/00; B32B 2250/02; B32B 2250/03; B32B 2307/73; C03C 17/00; C03C 17/22; C03C 17/23; C03C 17/34; C03C 17/3411; C03C 17/3417
USPC ......... 428/426, 428, 432, 688, 689, 697, 699, 428/701, 702
See application file for complete search history.

(56) References Cited

U.S. PATENT DOCUMENTS

| | | | | |
|---|---|---|---|---|
| 6,627,319 B2 * | 9/2003 | Jacquiod et al. | ............... | 428/448 |
| 6,916,542 B2 * | 7/2005 | Buhay et al. | .................. | 428/432 |
| 6,962,759 B2 * | 11/2005 | Buhay et al. | .................. | 428/699 |
| 7,311,961 B2 * | 12/2007 | Finley et al. | .................. | 428/212 |
| 8,133,599 B2 * | 3/2012 | Lu et al. | ........................ | 428/701 |
| 8,790,796 B2 * | 7/2014 | Buhay et al. | .................. | 428/702 |
| 2003/0228476 A1 * | 12/2003 | Buhay et al. | .................. | 428/469 |
| 2007/0068376 A1 * | 3/2007 | Jones et al. | .................. | 89/36.02 |
| 2007/0224357 A1 * | 9/2007 | Buhay et al. | .................. | 427/404 |
| 2009/0142602 A1 * | 6/2009 | Medwick et al. | ............. | 428/428 |
| 2009/0263651 A1 * | 10/2009 | Cook | ............................ | 428/339 |
| 2009/0308239 A1 * | 12/2009 | Jones et al. | .................. | 89/36.02 |
| 2010/0124642 A1 * | 5/2010 | Lu et al. | ........................ | 428/215 |
| 2010/0285290 A1 * | 11/2010 | Lu et al. | ........................ | 428/213 |
| 2010/0288117 A1 * | 11/2010 | Jones et al. | .................. | 89/36.02 |
| 2012/0172209 A1 * | 7/2012 | Lu et al. | ........................ | 502/214 |
| 2013/0344321 A1 * | 12/2013 | McSporran et al. | .......... | 428/336 |
| 2014/0087160 A1 * | 3/2014 | McSporran et al. | .......... | 428/216 |

* cited by examiner

*Primary Examiner* — David Sample
*Assistant Examiner* — Lauren Colgan
(74) *Attorney, Agent, or Firm* — Brownstein Hyatt Farber Schreck, LLP

(57) ABSTRACT

A component comprises a substrate having an alumina base layer, a transition layer, and a surface coating. The transition layer comprises alumina and silica, and the surface coating preferentially bonds to the silica as compared to the alumina.

18 Claims, 4 Drawing Sheets

OLEOPHOBIC COATING ON SAPPHIRE

CROSS-REFERENCE TO RELATED APPLICATIONS

This application claims priority to and the benefit of U.S. Provisional Patent Application No. 61/704,275, filed Sep. 21, 2012 and titled "Oleophobic Coating on Sapphire," the disclosure of which is hereby incorporated herein in its entirety.

TECHNICAL FIELD

The subject matter of this application relates generally to surface coatings on substrates. In particular, the application relates to oleophobic coatings and other surface coatings on substrates for uses as windows on electronic devices, including, but not limited to, mobile phones and portable computing devices.

BACKGROUND

Electronic devices may include a range of different touch-sensitive input surfaces, for example as incorporated into displays, track pads, keyboards, and combinations thereof. In use, however, oils and other deposits may affect appearance and performance, particularly where information is also displayed on the touch-sensitive surface (e.g., on a touch-sensitive display).

To address this problem, a number of different surface treatments are available, depending on substrate design and desired composition. Different surface treatments, however, may also exhibit different performance criteria, and not all surface treatments are compatible with all substrate materials. Thus, the issue of surface treatment raises a number of different design challenges, particularly for touch-sensitive surfaces subject to a range of different environmental conditions and operational demands.

SUMMARY

Various embodiments described herein encompass a component with a substrate having an alumina base layer, a transition layer comprising alumina and silica, and a surface coating that preferentially bonds to the silica. The base layer may comprise a single-crystal sapphire. The transition layer may transition substantially continuously from about 100% alumina at the base layer to include substantial silica content at the surface coating, or to about 100% silica or silica glass at the surface coating.

A surface layer may be formed on the transition layer, with a substantially silica content, for example substantially 100% silica or silica glass, and the surface coating may be oleophobic. A portable electronic device may comprise the coated component, the portable device may include a window, the oleophobic coating may be provided on an exterior surface of the window, and the window may also include a touch screen.

In additional embodiments, a window for a portable electronic device may include a substrate having a sapphire glass base layer, a transition layer of alumina and silica on the sapphire glass base layer, and an oleophobic coating. The oleophobic coating preferentially bonds to the silica as compared to the alumina.

The transition layer may transition from at least 90% alumina at the base layer to at least 50% silica or silica glass at the oleophobic coating, or to at least 90% silica or silica glass at the coating. The oleophobic coating may also comprise an alkylsilane and a perfluorinated end group, and a touch screen may be provided in the window, with the oleophobic coating on an exterior surface of the touch screen.

In method embodiments, a sapphire substrate for a touch screen window is provided with a substantially single-crystal base layer. A transition layer of alumina and silica and a surface coating are formed on the substrate, where the surface coating preferentially bonds to the silica as compared to the alumina.

The transition layer may be formed by vapor deposition of alumina and silica onto the sapphire substrate, and may transition from substantially 100% alumina at the sapphire substrate to more than 50% silica or silica glass at the surface coating, or to substantially 100% silica or silica glass at the surface coating. The surface coating may be formed as an oleophobic coating having an end group that preferentially bonds to the silica, as compared to the alumina. In addition, the sapphire substrate may be compressed by ion implantation.

DETAILED DESCRIPTION

Figure 1:
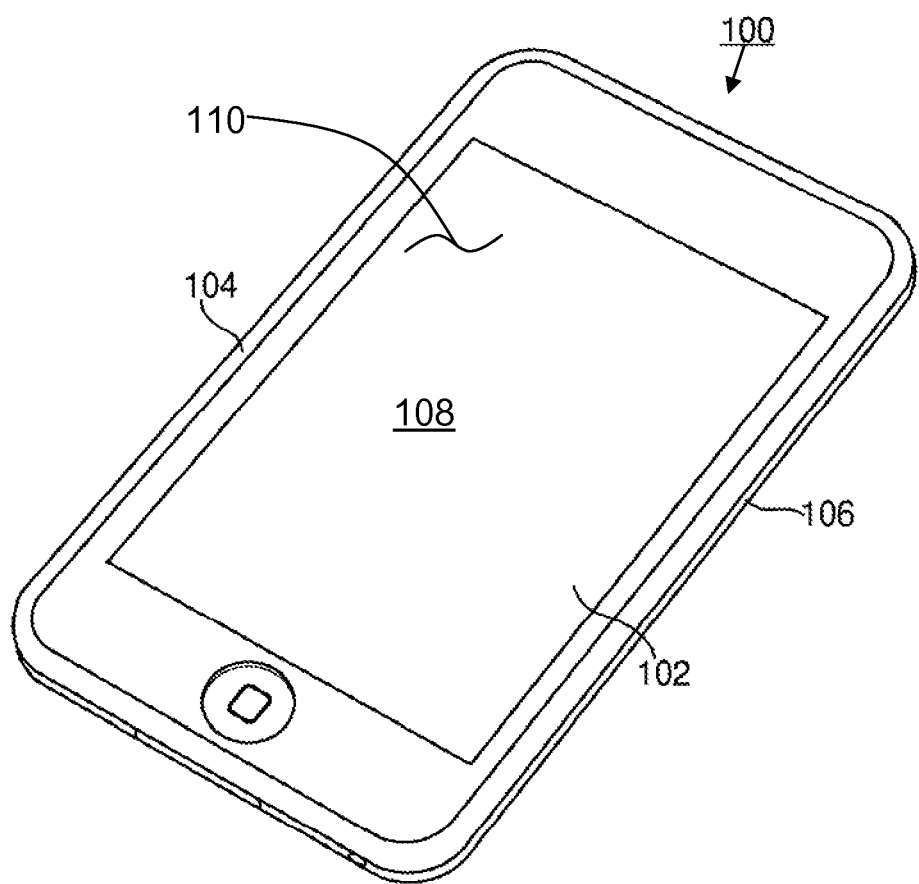
FIG. 1 is a perspective view of an electronic device having a surface treatment.

FIG. 1 is a perspective view of electronic device 100, for example a mobile phone, tablet computer or other portable device 100 having at least one surface on which an oleophobic coating or other surface treatment is applied. For example, electronic device 100 may include window 102 with a bezel 104 about all or a part of its edge, where bezel 104 is couplable to housing 102 in a manner that secures window 106 to portable device 100.

Depending on the application, bezel 104 and housing 106 may be formed of a variety of different materials including, but not limited to, plastics and other polymer materials, aluminum, steel and other metals, amorphous glass materials, composite materials, and combinations thereof. Window 102 is formed of a suitable transparent or translucent material, for example a transparent plastic or polymer material, a transparent, amorphous glass material, or a transparent crystalline material such as sapphire or sapphire glass.

A touch sensitive screen or other component with exterior surface 108 may be incorporated into device 100, for example within or beneath window 102 as shown in FIG. 1. In this particular embodiment, device 100 bezel 104 incorporates a touch-sensitive layer beneath window 102 that is configured to recognize user input by manipulating virtual objects displayed on device 100, sensing touches, and the like.

To reduce oils and other deposits on surface 108, an oleophobic treatment or other coating 110 may be applied. Coating 110 may also include a range of different materials having suitable oleophobic or other properties, for example oleophobic polymer materials, optical coatings, scratch-resistant coatings, and combinations thereof.

In one embodiment, an oleophobic material or other coating is formed on surface 108 by liquid vapor deposition, for example as described in Weber and Matsuyuki, DIRECT LIQUID VAPORIZATION FOR OLEOPHOBIC COATINGS, U.S. patent application Ser. No. 13/024,964 filed Feb. 10, 2011, the entirety of which is incorporated by reference herein. Alternatively, oleophobic materials and other suitable coatings may be deposited by other processes, including, but not limited to, chemical vapor deposition, physical vapor deposition, electrochemical techniques, spraying, dipping, sputtering, optical coating processes, and combinations thereof.

In each of these applications, bonding of the coating material generally depends not only upon a coating process used to apply the oleophobic layer but also upon substrate composition, as expressed in the material of window 102 and bezel 104. With respect to electronic devices, for example, the coating may bond differently to sapphire, sapphire glass, and other aluminum oxide based materials, as compared to silicate (silica or silicon-based) glass materials, including quartz glass and leaded glass, and as compared to other non-sapphire and non-aluminum oxide based substrate materials. To address this issue, the substrate forming window 102 or bezel 104 may be provided with a transitional layer, as described below.

Figure 2A:
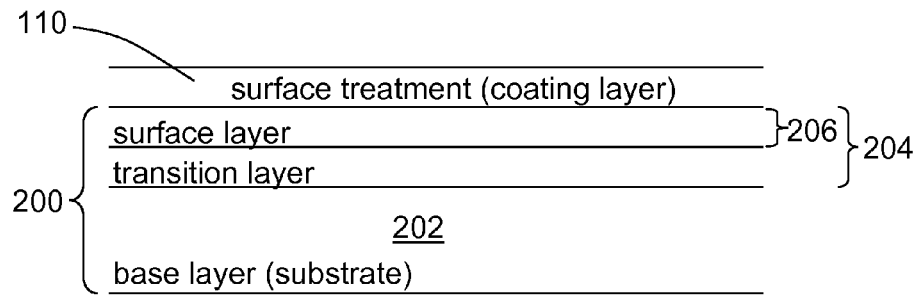
FIG. 2A is a cross-sectional schematic view of a substrate having a treated surface.

FIG. 2A is a cross-sectional schematic view of substrate 200 with an oleophobic coating or other surface treatment 110. Substrate 200 is formed of base layer 202 with transitional layer 204 and surface layer 206, to which surface treatment 110 is applied.

In one particular application, base layer 202 is formed of a sapphire or sapphire glass material, for example an aluminum oxide or alumina ($Al_2O_3$ or $\alpha$-$Al_2O_3$) material. While suitable sapphire materials may be found naturally, base layer 202 may also be formed of a synthetic sapphire material, for example by sintering and fusing aluminum oxide, hot isostatic pressing, and processing the resulting polycrystalline product to form a substantially single-crystal sapphire base layer 202. Suitable methods for forming such a base layer 202 also include, but are not limited to, Verneuil processes, Czochralski processes, flux methods, and variations and combinations thereof.

Alternatively, base layer 202 may be formed of an amorphous aluminum oxide, transparent alumina or other sapphire-like material, for example by thin film deposition, sintering, vapor deposition, or other process. In these examples, base layer 202 may also include a combination of amorphous and polycrystalline components, in order provide a selected combination of transparency and hardness.

Transitional layer 204 is formed of a combination of base layer materials and other components, for example a combination of alumina and silica or silica glass. Where base layer 202 is formed of sapphire, sapphire glass or another alumina-based material, for example, transition layer 204 may be formed of a combination of alumina and silica, in order to provide a smooth or continuous material composition transition from base layer 204 to surface layer (or surface interface) 206.

Surface 206 of transition layer 204 may also have a substantially two-component composition, including both alumina and silica materials in any of these proportions. Alternatively, surface layer 206 may be formed of a substantially 100% silica-based material such as silica glass, with substantially no alumina content (e.g., less than 10%, less than 5%, less than 2%, or less than 1%). These options provide substrate 200 with a combination of different hardness and bonding properties across base layer 202, transition layer 204 and surface layer 206, which can be selected for different electronics devices and other applications.

In general, the relative alumina and silica or silica glass concentrations may be defined on a mass or volume basis. In addition, other materials may also be present, for example iron, titanium, chromium, copper, magnesium and other metals in the sapphire or alumina components, and soda, lime, or dolomite in the silica glass components, along with various fining agents and other processing components.

In general, the use of sapphire materials provides substrate 200 with substantially increased hardness, as compared to silica-based glass and other materials. For example, substantially single-crystal forms of sapphire glass may have a hardness of up to about 2000 points on the Vickers scale (about 19.6 GPa), or in a range of about 1800-2300 points on the Vickers scale (about 27.7-22.5 GPa). Alternatively, sintered polycrystalline forms of alumina or sapphire glass may have a Vickers hardness of about 1200-2000 points on the Vickers scale (about 11.8-19.6 GPa), depending on grain size, and fused amorphous forms may have a hardness of about 1000-1200 points on the Vickers scale (about 9.8-11.8 GPa).

This compares to a typical range of about 500-700 points on the Vickers scale (about 4.9-6.9 GPa) for silica-based glass materials, depending on composition. For example, high silica glass (e.g., >70% silica) may range up to 640-700 points on the Vickers scale (about 6.3-6.9 GPa), and leaded glass may range from about 500-560 points on the Vickers scale (about 4.9-5.5 GPa), based on a lead oxide content of about 18-40%.

Thus, sapphire and alumina-based materials provide greater hardness and strength for increased scratch and impact resistance, as applicable to electronics display and touch-screen applications. At the same time, however, oleophobic coatings and other polymer-based surface treatments 110 are subject to different chemical bonding processes on alumina and silica-based substrates 200, and these different bonding properties may affect performance.

In abrasion tests, for example, some coatings and surface treatments 110 exhibit wear at a lower number of abrasive cycles when applied to sapphire glass and other alumina-based base layers 202 (e.g., less than 300 cycles), as compared to silica glass, where the coatings may not exhibit wear until a higher number of abrasive cycles (e.g., 300 cycles or more). In addition, surface treatments 110 applied to silica surface layers 206 may also exhibit wear at a substantially lower number of cycles when no transition layer 204 is present (e.g., 150-170 cycles or less), for example due to separation along the abrupt sapphire/silicate or alumina/silica transition.

To address these concerns, transition layer 204 is provided to create a substantially continuous or less discrete transition between base layer 202 and surface layer 206, and to provide a combination of improved bonding and hardness properties. For example, transition layer 204 may be provided by sputtering a mixture of alumina and silica (or silica glass) onto base layer 202 of substrate 200, where the composition varies from substantially 100% alumina (or amorphous sapphire) at base layer 202 to substantially 100% silica (or silica glass) at surface layer 206.

Alternatively, the composition of transition layer 204 may vary, as described above and below. Other deposition and surface treatment processes may also be used, including, but not limited to, electron beam and physical vapor deposition, electron beam evaporation, ion implantation, and particle vapor deposition.

Figure 2B:
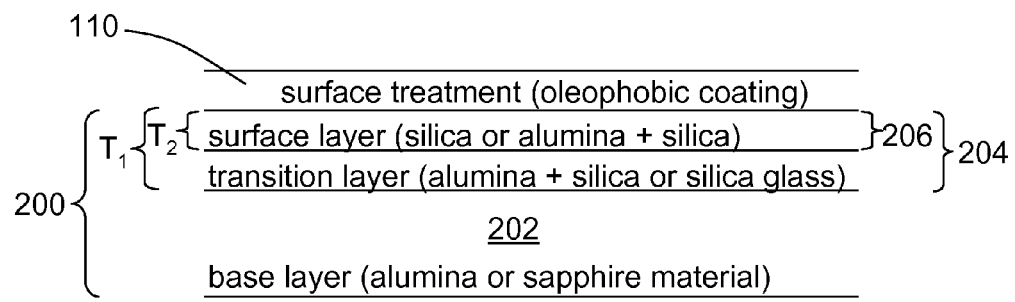
FIG. 2B is a cross-sectional schematic view of the substrate, in a sapphire or sapphire glass embodiment with an alumina/silica transition layer and oleophobic coating.

FIG. 2B is a cross-sectional schematic view of substrate 200, in a sapphire or sapphire glass embodiment with an oleophobic coating 110. In this particular configuration, base layer 202 is formed of a substantially single-crystal sapphire or sapphire glass material, and alumina/silica transition layer 204 includes surface layer 206 with oleophobic coating 110.

The composition of transition layer 204 varies, depending on application. For example, transition layer 204 may transition from about 50% or more alumina content at base layer 202 to more than 50% silica or silica glass content at surface layer 206, e.g., from about 80-90% or about 90-100% alumina content to about 80-90% or about 90-100% silica or silica glass content. Alternatively, the relative proportions of alumina and silica (or silica glass) may vary between these ranges, for example in a ratio of about 30%/70%, about 40%/60%, about 50%/50%, about 60%/40% or about 70%/30%, in either order (that is, alumina/silica or silica/alumina), depending on desired bonding and hardness properties at base layer 202 and surface layer 206.

In some embodiments, surface layer 206 may have substantially uniform composition. For example, surface layer 206 may provide transition layer 204 with a thickness of substantially 100% silica or silica glass, or surface layer 206 may provide transition layer 204 with a thickness of a substantially uniform mixed silica or silica glass and alumina composition, at any of the composition ratios above, or at another value therebetween. Alternatively, surface layer 206 may be absent, or provided as a separate layer, distinct from transition layer 204.

The total thicknesses of transition layer 204 ($T_1$), including any surface layer 206 ($T_2$) also varies, depending on application. In general, where transition layer 204 has a substantial silica content, for example greater than 10% or greater than 50%, thickness $T_1$ may be selected to have a relatively low value and thickness $T_2$ may be nominal, in order to increase hardness near the outer (top) surface of substrate 200, or to keep any scratches from showing.

For example, thickness $T_1$ of transition layer 204 may be about 10-50 nm, about 10-70 nm, or about 10-100 nm, or less than about 100 nm, less than about 70 nm, or less than about 50 nm. In these designs, thickness $T_2$ of surface layer 206 may be less than 10 nm, or surface layer 206 may be substantially a monolayer, such that surface layer 206 is defined approximately at the outer (top) interface of transition layer 204, where surface treatment 110 is applied. Alternatively, surface layer 206 may have substantially no thickness, or surface layer 204 may be absent.

In additional embodiments, surface treatment or coating layer 110 may be applied in combination with one or both of transition layer 204 and surface layer 206, so that surface layer 206 provides a thin interface comprising both an oleophobic coating (or other surface treatment 110) and a silica or silicat/alumina layer, as described above. In these applications, components of surface treatment layer 110 may extend into the surface of substrate 200, for example into voids, cracks or spaces in surface layer 206, transition layer 204, or both.

Ion implantation techniques may also be utilized to improve the performance of substrate 200. In an ion implantation process, the surface of substrate 200 is bombarded with ions, for example N+ (nitrogen) ions, providing a compressive stress layer of up to about 600 nm or more in thickness, for improved resistance to defect propagation. Such a layer may be provided, for example, in base layer 202, transition layer 204, surface layer 206, or a combination thereof.

Figure 3:
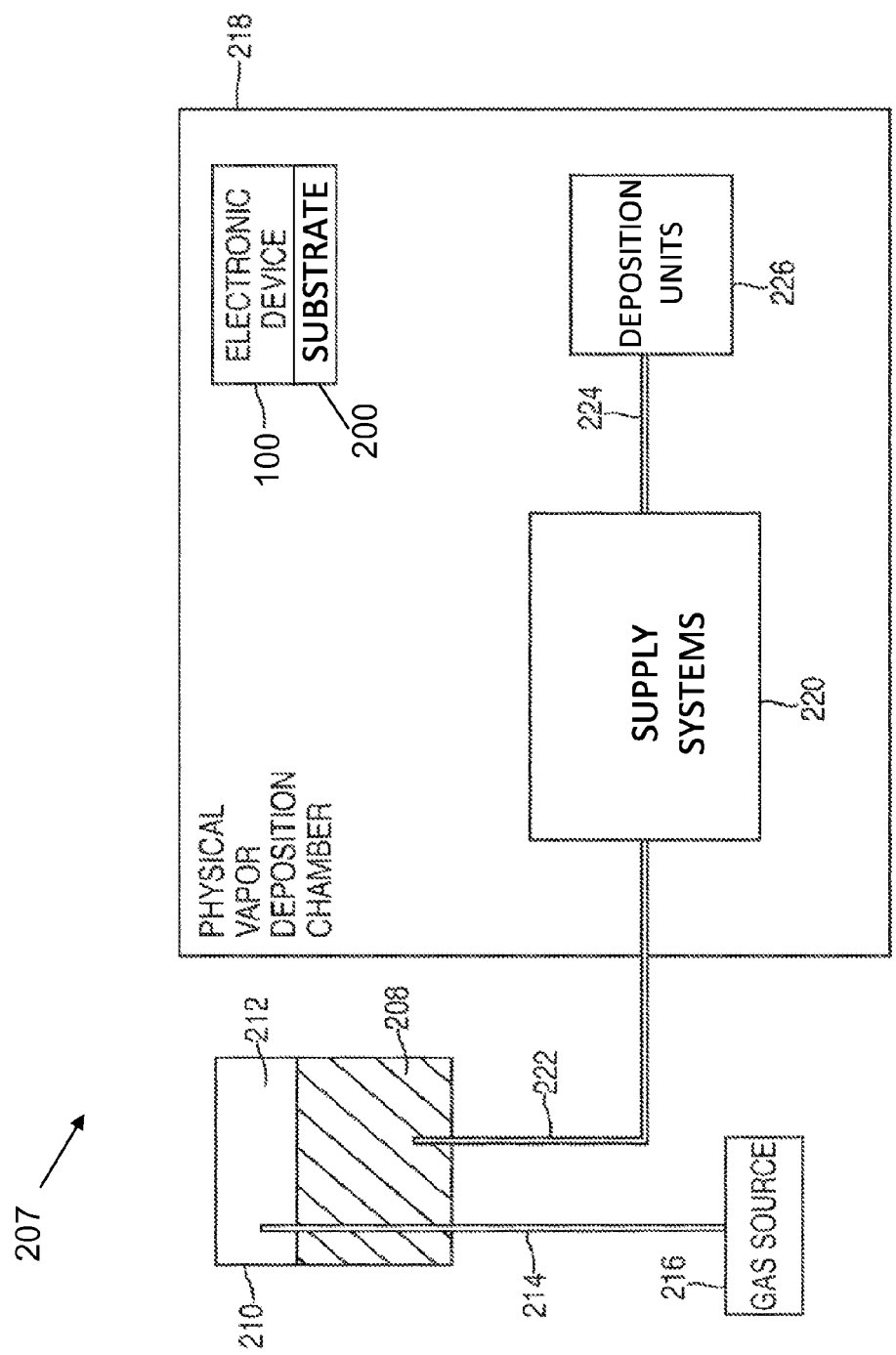
FIG. 3 is a schematic view of a system for applying the surface treatment.

FIG. 3 is a schematic view of surface processing apparatus 207 for example as applied to substrate 200 of electronic device 100, as described above. In this particular example, deposition system 207 includes one or more reservoirs 210 with various coating materials 208 (e.g., silica, alumina, and an oleophobic material or other surface treatment). An inert gas 212 (e.g., argon or nitrogen) may be supplied by gas source 216 through purge or pressurization flow pipe 214, in order to reduce oxidation, wetting and contamination within reservoirs 210.

Depending on design, reservoirs 210 are coupled to vacuum chamber 218 by one or more delivery tubes 222, as configured to deliver materials 208 from reservoirs 210 to supply systems 220. Supply systems 220 utilize a suitable combination of tubes, pumps, valves and other components to direct materials 208 into vaporizing or deposition units 226 for deposition onto substrate 200, for example on outer surface 108 of a window 102 or bezel 104 on electronic device 100, as described above with respect to FIG. 1.

In the particular configuration of FIG. 3, deposition units 226 are provided in the form of physical or chemical vapor deposition (CVD or PVD) components. Alternatively, other processes and components may be utilized, for example to treat substrate 200 by sputtering, electron beam deposition or electron beam evaporation, or a combination of such processes.

In general, supply systems 220 and deposition units 226 are controlled to deposit selected amounts of material (e.g., silica, silica glass, alumina, oleophobic materials and other surface treatments) onto substrate 200 in particular orders and combinations, as described above with respect to FIGS. 2A and 2B.

Some materials 208 such as oleophobic ingredients and other coating materials may be provided in concentration, for example 10% to 100% in combination with a dilutant or solvent, and such materials may also be applied by dip coating or other direct application process. Alternatively, solid materials 208 such as silica, silica glass, and alumina may also be provided within one or more supply systems 220 or deposition units 226, without reservoir 210 and other external components.

In some embodiments, surface treatment system 207 also controls pressure, temperature and humidity to operate chamber 218 as a vacuum chamber or other cemical of physical vapor deposition environment. Surface treatment system 207 may also maintain a particular temperature for the surface coating process, for example between about 100 C and about 150 C, or between about 100 C and about 170 C. Air may also be provided within chamber 218, either during or after the coating process, in order to expose substrate 200 to atmosphere in a controlled process, before removal from chamber 218.

Figure 4:
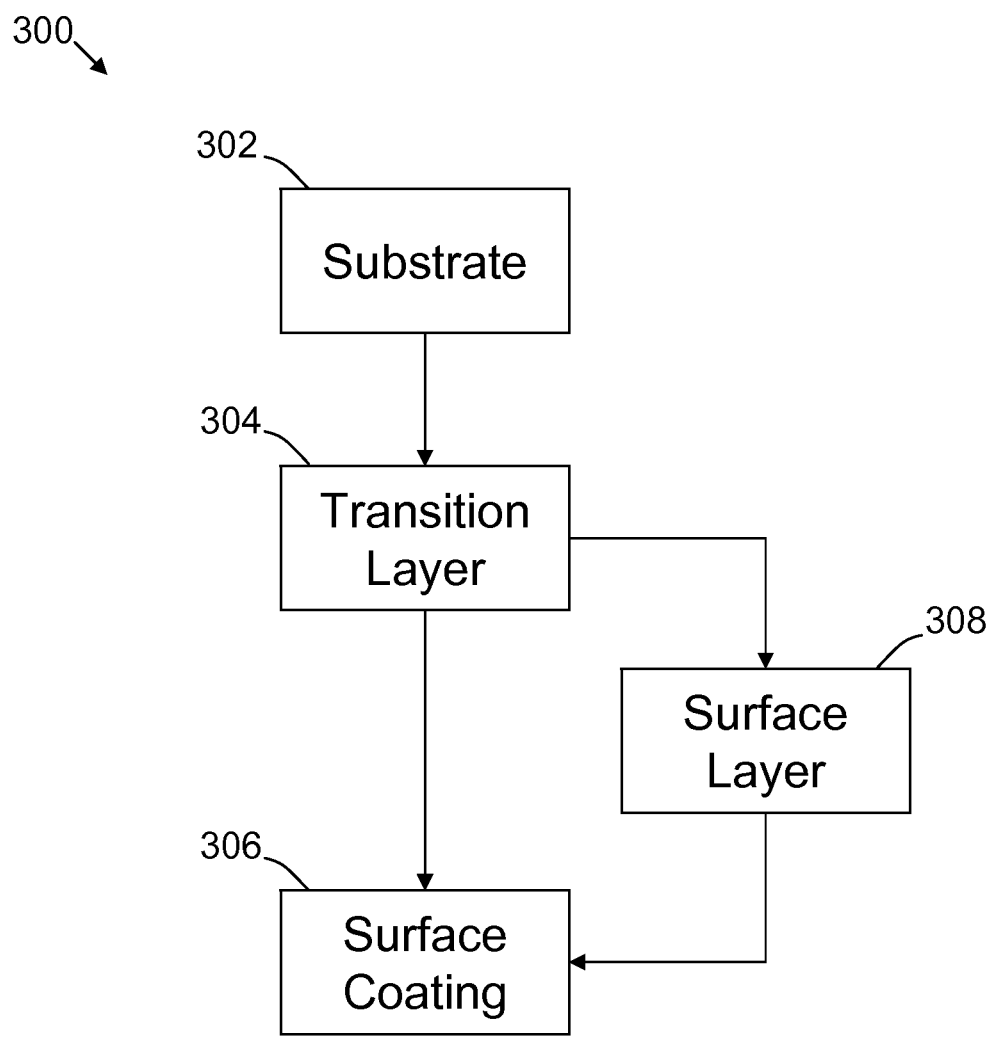
FIG. 4 is a block diagram of a method for coating a substrate.

FIG. 4 is a block diagram of method 300 for coating a substrate, for example substrate 200 for use in electronic device 100 as described above with respect to FIGS. 1, 2A, 2B and 3. Method 300 includes one or more steps selected from preparing a substrate (step 302), forming a transition layer on the substrate (step 304), and forming a surface treatment or coating on the substrate (step 306). Depending on application, the surface coating may be provided directly onto the transition layer, or on a transition layer including a surface layer (step 308).

Preparing the substrate (step 302) may comprise cleaning and other surface preparation steps, for example using water or a chemical solvent, heat treatment, polishing, and other surface preparation processes performed on base layer 202 of substrate 200, as shown in FIGS. 2A and 2B. In one particular embodiment, the substrate is formed of a substantially single crystal (e.g., synthetic) sapphire, which may be cut to size for a particular application, for example a synthetic sapphire blank for a bezel 104, window 102 or other component of a mobile phone or other portable electronic device 100, as shown in FIG. 1.

Alternatively, a different sapphire, sapphire glass or alumina substrate may be utilized, for example including amorphous or polycrystalline alumina components. Preparing the substrate may also comprise ion implantation, as described above, for example after polishing the surface of the base layer, or after formation of the transition layer and any surface layer.

Forming a transition layer (step 304) may comprise sputtering, physical or chemical vapor deposition, or other material process to provide a transition from the base layer composition of the substrate to another material composition, as described above for transition layer 204 of FIGS. 2A and 2B. The transition layer may have an amorphous or polycrystalline structure, so that there is a physical or structural transition at the interface to a substantially single-crystal base layer.

Depending on application, the material transition may nonetheless be continuous, for example from substantially 100% alumina at the base layer, transitioning substantially continuously to about 100% silica or silica glass at the surface layer, as described above. Alternatively, the transition layer may extend from a region of substantially 100% alumina to a region of less than 100% silica or silica glass at the surface layer, for example between about 10% and about 50% alumina and about 50% to about 90% silica or silica glass.

There may also be a discontinuous transition in the material composition of the transition layer, for example from substantially 100% alumina in the base layer to a relative concentration of about 90% to about 100% alumina at the base layer/transition layer interface. Alternatively, the transition layer may have a concentration of about 50% to about 90% alumina at the base layer, or between about 10% and about 90% alumina.

Forming a surface treatment (step 306) may be performed via physical vapor deposition or other processes, as described above, for example to provide surface treatment layer 110 on transition layer 204 or surface layer 206 of substrate 200, as shown in FIGS. 2A and 2B. In one particular embodiment, the surface treatment comprises an oleophobic coating material, for example perfluorinated hydrocarbon chain of a polymer with a perfluorinated hydrocarbon end group. Alternatively, a hydrophobic coating may be applied.

In these various embodiments, the coating material may also include an end group that bonds preferentially to silca, as compared to alumina. For example, an OH modified polymer or silane material may be used, or an alkyl end group or other suitable end group that preferentially bonds to the silica component of the transition layer (or surface layer), as compared to the alumina component.

The surface coating may thus be provided directly on the transition layer, or on a surface layer formed over or as part of the transition layer (step 308), for example surface layer 206 as shown in FIGS. 2A and 2B. Depending on application, the surface layer may be provided as a substantially 100% silica or silica glass layer, in order to improve bonding to the surface coating. Alternatively, the surface layer may have mixed composition, for example between about 90% and about 100% silica, or between about 50% and about 90% silica, with a corresponding alumina content.

In addition, the surface layer may have a thickness of up to 10 nm or more, for example about 10-20 nm or about 10-50 nm. Alternatively, the surface layer may be relatively thin, for example 10 nm or less, or the surface layer may be absent. Depending on application, the surface layer may also be defined as a monolayer or other thin layer on the top surface of the transition layer. Thus, the surface coating may be applied directly to a transition layer, to a surface layer that is part of a transition layer, or to a separate surface layer.

While embodiments herein are described with reference to exemplary embodiments, it will be understood by those skilled in the art that various changes may be made and equivalents may be substituted in order to adapt these teachings to particular materials, structures, methods and applications, without departing from the essential scope and sprit of the invention as claimed. The invention is thus not limited to the particular examples that are disclosed herein, but encompasses all embodiments falling within the scope of the appended claims.

We claim:

1. A handheld, portable electronic device comprising:
a window comprising:
a substrate having an alumina base layer;
a transition layer on the substrate, the transition layer comprising alumina and silica; and
a surface coating on the substrate, wherein the surface coating bonds to the silica as compared to the alumina.

2. The electronic device of claim 1, wherein the alumina base layer comprises a substantially single-crystal sapphire.

3. The electronic device of claim 1, wherein the transition layer transitions substantially continuously from about 100% alumina at the base layer to include a substantial silica component at the surface coating.

4. The electronic device of claim 1, wherein the transition layer transitions substantially continuously from about 100% alumina at the substrate to about 100% silica or silica glass at the surface coating.

5. The electronic device of claim 1, further comprising a surface layer formed on the transition layer, wherein the surface layer comprises a substantially constant silica component and the surface coating bonds to the silica in the surface layer.

6. The electronic device of claim 5, wherein the surface layer comprises substantially 100% silica or silica glass.

7. The electronic device-of claim 5, wherein a thickness of the transition layer is within a range of approximately 10 nanometers (nm) and approximately 100 nm.

8. The electronic device of claim 7, wherein a thickness of the surface layer is less than the thickness of the transition layer.

9. The electronic device of claim 7, wherein the thickness of the surface layer is one of equal to, or less than, approximately 10 nm.

10. The electronic device of claim 1, wherein the surface coating comprises an oleophobic coating.

11. A handheld, portable electronic device comprising:
a window comprising:
a substrate having an alumina base layer;
a transition layer on the substrate, the transition layer comprising alumina and silica; and
an oleophobic coating on the substrate, wherein the oleophobic coating bonds to the silica as compared to the alumina.

12. The electronic device of claim 11, wherein the oleophobic coating is provided on an exterior surface of the window.

13. The electronic device of claim 12, further comprising a touch screen in the window.

14. A handheld, portable electronic device comprising:
a window comprising:
a substrate having a sapphire glass base layer;
a transition layer on the sapphire glass base layer, the transition layer comprising alumina and silica; and
an oleophobic surface coating on the substrate, wherein the oleophobic surface coating bonds to the silica as compared to the alumina.

15. The electronic device of claim 14, wherein the transition layer transitions from at least 90% alumina at the base layer to at least 50% silica or silica glass at the oleophobic coating.

16. The electronic device of claim 15, wherein the transition layer transitions to at least 90% silica or silica glass at the oleophobic coating.

17. The electronic device of claim 14, wherein the oleophobic coating comprises an alkylsilane and a perfluorinated end group.

18. The electronic device of claim 14, further comprising a touch screen provided in the window, wherein the oleophobic surface coating is provided on an exterior surface of the touch screen.

* * * * *